(No Model.)
O. DUPAS.
HORSE DETACHER.
No. 300,056. Patented June 10, 1884.
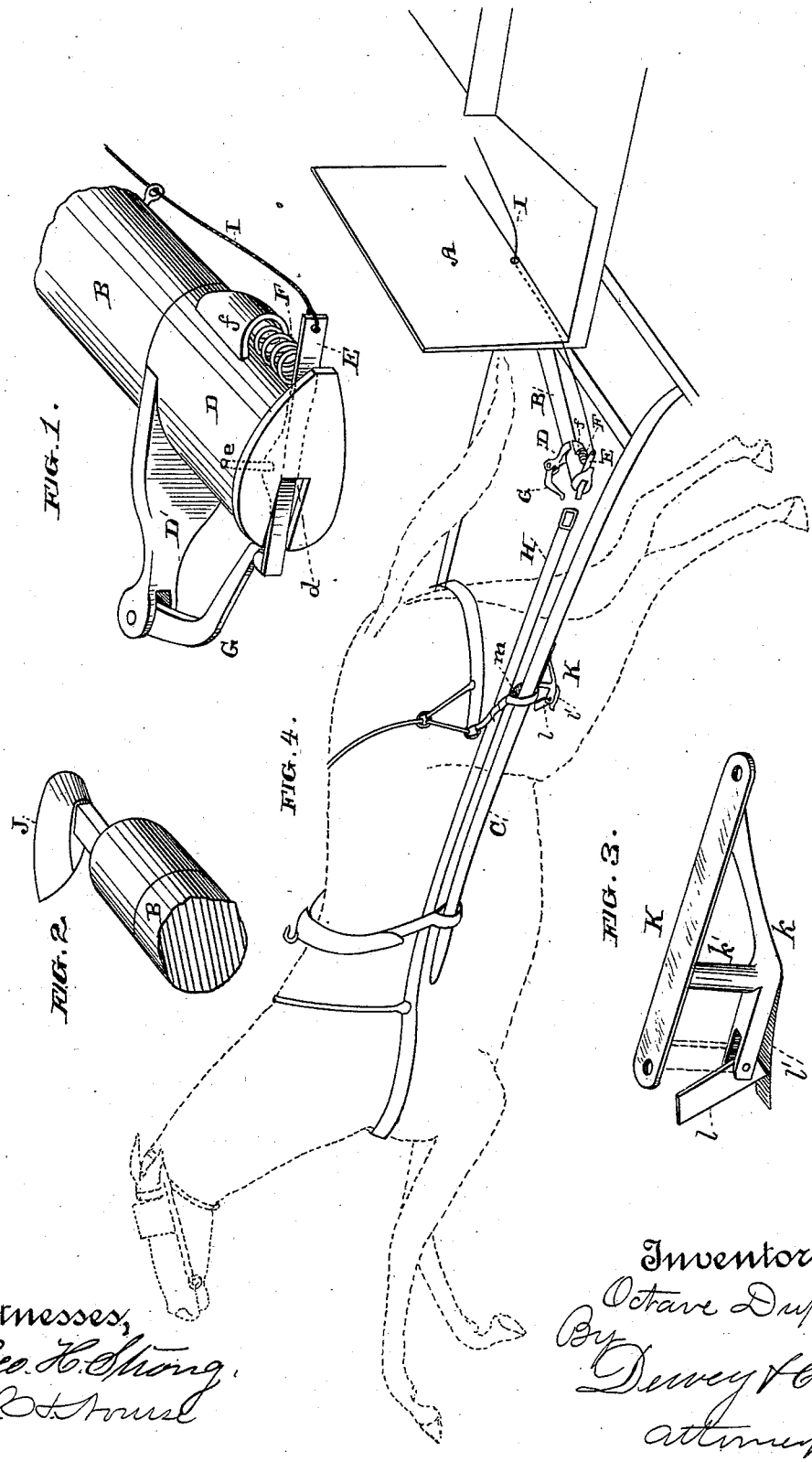
Witnesses,
Geo. H. Strong.
J. S. [illegible]
Inventor,
Octave Dupas
By
Dewey & Co.
Attorneys.

UNITED STATES PATENT OFFICE.

OCTAVE DUPAS, OF SAN RAFAEL, CALIFORNIA, ASSIGNOR OF ONE-HALF TO ISAAC SHAVER, OF SAME PLACE.

HORSE-DETACHER.

SPECIFICATION forming part of Letters Patent No. 300,056, dated June 10, 1884.

Application filed March 7, 1884. (No model.)

*To all whom it may concern:*

Be it known that I, OCTAVE DUPAS, of San Rafael, Marin county, and State of California, have invented an Improvement in Horse-Detaching Apparatus; and I hereby declare the following to be a full, clear, and exact description thereof.

My invention relates to a new and useful apparatus for detaching or releasing a horse from the shafts and whiffletree of a vehicle when such release becomes necessary for the safety of the riders, upon the horse running away or becoming frightened.

My apparatus consists in a pivoted latched hook on one end of the whiffletree, of a peculiar beveled hook on the other, and of a spring releasing-guard on the shafts, through which the breeching of the harness is passed, all of which I shall hereinafter fully describe by reference to the accompanying drawings, in which—

Figure 1 is a perspective view of one end of the whiffletree, showing the devices thereon. Fig. 2 is a view of the other end of the whiffletree, showing the trace-lug J. Fig. 3 is a perspective view of the breech-releasing mechanism on the shafts. Fig. 4 is a view showing the application of my apparatus.

The object of my invention is to insure the release of the horse in the easiest manner, and thereby prevent accident or injury.

A is a portion of a vehicle, of which B is the whiffletree, and C the shafts. On one end of the whiffletree is a metal cap, D, forming a socket, in which a latch, E, is pivoted at *e*. The rear end of the latch is influenced by a spring, F, seated against it, and in a small socket, *f*, formed with the main cap D. The forward end of the latch is hooked and plays in a slot, *d*, made in the end and front side of the cap. An arm, D', extends forwardly from the cap D, and has pivoted in its end the curved trace-hook G, the other end of which is notched and is adapted to enter the slot in cap D, and to be engaged and held in place by the hooked end of the latch. The position of these parts and their engagement are such that the strain on the trace is in a direct line, and there is therefore no tendency to become disengaged; but when the rear end of the latch is pulled upon, its forward end is thrown outward, releasing the pivoted trace-hook and allowing the trace H to slip off. This operation of the latch is effected by means of a cord, I, secured to it and passing back to within convenient reach of the driver. The latching mechanism is not exposed or in the way, and is therefore not liable to be injured. Upon the other end of the whiffletree is the trace lug or hook J. This consists of a shank secured in the whiffletree, and a head having a long point in front and a short back, both front and back being beveled on the ends and curvilinear on the sides, forming a boat-like shape, the prow of which extends forwardly. When the trace on the other side is released from the hook G, a momentary strain being brought on the hook J, the whiffletree is turned at an inclination or angle in such manner that the curvilinear or beveled point of the hook acts as a wedge in entering and forcing open the trace-loop sufficient to allow the strain to pull the trace off the hook; but this detachment of the traces would be of little use if some means were not provided for releasing the breeching of the harness.

On the shafts C, I have bolted the guard K, consisting of a base-plate, an angled standard, *k*, a brace, *k'*, and a spring-strip, *l*. This strip is free at one end, and is pivoted at its other end in the angled standard, being held to its place by a spring, *l'*. The breeching-straps *m* are passed through the space between the standard and spring-strip, and may or may not be then wound about the shafts. The holdback-pressure is on the fixed standard, and no pressure is brought on the pivoted spring-strip until after the traces are freed, when the strain is sufficient to pull the holdbacks out against and free them from the pivoted strip. Then, if the holdbacks have been wrapped around the shafts, their loop is of course loosened by the displacement and disengagement of the straps from the guard, and may easily be pulled from the shafts. In case no breeching is used, as in double harness, the trace disengagement is sufficient; and on the whiffletree I may put the pivoted hook and latch arrangement on both ends.

I am aware it is not broadly new to form on the end of the whiffletree a cap provided with a projecting arm, on which is pivoted a hook and latch, and such I do not claim as my invention.

Having thus described my invention, what I claim as new, and desire to secure by Letters Patent, is—

1. In a horse-detaching apparatus, and in combination with the whiffletree of a vehicle, a pivoted trace-hook on one end of the whiffletree, and a latch and latch-tripping mechanism for engaging and releasing the trace-hook, whereby the trace may be held or pulled off, and a trace lug or hook on the other end of the whiffletree adapted, when the tree is turned at an angle by the release of the opposite trace, to free itself from the loop of its trace, substantially as herein described.

2. In a horse-detaching apparatus, and in combination with the whiffletree B, the cap D on its end, having a slot, $d$, and forwardly-extending arm D', the curved trace-hook G, pivoted in the end of the arm, latch E, pivoted within the end of the cap, and adapted to engage the end of hook G, the spring F, for holding the latch to its engagement, and the cord I, for tripping the latch, all arranged and operating substantially as and for the purpose herein described.

3. In a horse-detaching apparatus, and in combination with the pivoted trace-hook G, and latching and tripping mechanism on one end of the whiffletree, as described, the trace lug or hook J on the other end of the whiffletree, said lug having a head with a curved face and beveled long front, and a curved and beveled short back, substantially as and for the purpose herein described.

In witness whereof I hereunto set my hand.

OCTAVE DUPAS.

Witnesses:
ISAAC SHAVER,
THOMAS BODKIN.